(12) United States Patent
Beaulieu (10) Patent No.: US 7,629,713 B2
(45) Date of Patent: Dec. 8, 2009

(54) ELECTROMAGNETIC MOTOR

(75) Inventor: Gérald Beaulieu, Mirabel (CA)

(73) Assignee: BGWTECH Inc., Mirabel, Quebec (CA)

( * ) Notice: Subject to any disclaimer, the term of this patent is extended or adjusted under 35 U.S.C. 154(b) by 589 days.

(21) Appl. No.: 11/402,964

(22) Filed: Apr. 13, 2006

(65) Prior Publication Data

US 2008/0079320 A1  Apr. 3, 2008

Related U.S. Application Data

(60) Provisional application No. 60/671,080, filed on Apr. 14, 2005.

(51) Int. Cl.
*H02K 41/00* (2006.01)
(52) U.S. Cl. .......................... 310/12; 123/1 A
(58) Field of Classification Search .................. 310/12, 310/15, 75 R, 96, 100; 123/1 A, 1 R, 46 E
See application file for complete search history.

(56) References Cited

U.S. PATENT DOCUMENTS

| | | | |
|---|---|---|---|
| 3,747,649 A | 7/1973 | Densow et al. | |
| 4,213,428 A | 7/1980 | Bradley | |
| 4,317,058 A | 2/1982 | Blalock | |
| 4,749,893 A | 6/1988 | Reynolds | |
| 5,036,930 A | 8/1991 | Bisel et al. | |
| 5,146,123 A * | 9/1992 | Yarr | 310/15 |
| 5,203,172 A | 4/1993 | Simpson et al. | |
| 5,287,518 A | 2/1994 | Miller et al. | |
| 5,389,844 A * | 2/1995 | Yarr et al. | 310/15 |
| 5,457,349 A | 10/1995 | Gifford | |
| 6,077,054 A * | 6/2000 | Lee et al. | 417/417 |
| 7,242,118 B2 * | 7/2007 | Sakamoto | 310/15 |

* cited by examiner

*Primary Examiner*—Thanh-Tam T Le
(74) *Attorney, Agent, or Firm*—Equinox Protection; Franz Bonsang, Patent Agent (57) ABSTRACT

An electromagnetic motor includes a permanent magnet connected to a piston component of the motor and defining a linear reciprocating displacement path; and two electromagnets connected to the cylinder housing that periodically and alternately interact with the permanent magnet. The electromagnets are electrically connected to a power source for their selective activation. The electromagnets magnetically attract the permanent magnet over a respective first portion of the displacement path when un-activated and magnetically repulse the permanent magnet over a respective second portion of the displacement path when momentarily activated by the power source. The motor could include a plurality of second permanent magnets connected to the crankshaft and defining a circular displacement path, and a plurality of third electromagnets connected to the power source and mounted on the crankcase adjacent and radially outwardly from the circular displacement path of the second permanent magnets to periodically and successively interact therewith.

24 Claims, 5 Drawing Sheets

ELECTROMAGNETIC MOTOR

CROSS-REFERENCE TO RELATED APPLICATIONS

The present application is related to U.S. Provisional Application for Patent Ser. No. 60/671,080 filed on Apr. 14, 2005.

FIELD OF THE INVENTION

The present invention relates to electromagnetic motors for vehicles, and is more particularly concerned with an electromagnetic motor that can be used in hybrid motors when in conjunction with conventional internal combustion motors combined with an electromagnetic energy source to reduce fuel consumption and increase efficiency thereof.

BACKGROUND OF THE INVENTION

It is well known in the art to combine an alternate and cleaner source of energy with the conventional internal combustion motor of vehicles to provide so-called "green" motor of alternate non-polluting energy sources or hybrid motor that reduces the fuel consumption thereof as well as the overall pollution generated by such a motor. Most hybrid motors generally combine either an electric motor, or a plurality thereof, or a hydrogen motor to the conventional internal combustion engine (gasoline or diesel); the two motors running either independently or simultaneously with each other, depending of the amount of power required.

These types of hybrid motors generally suffer problems by requiring that each motor has its own engine block, transmission/gear train box and/or propulsion mechanism; meaning more mass, more volume and increased complexity that lead to increased manufacturing and maintenance costs.

Many documents also refer to the addition of electromagnetic components or systems to existing internal combustion engines. Examples of such documents are:

U.S. Pat. No. 3,747,649 issued to Densow et al. on Jul. 24, 1973 for "Crankshaft Magneto System";

U.S. Pat. No. 4,213,428 issued to Bradley on Jul. 22, 1980 for "Electromagnetic Augmentation of Internal Combustion Engines";

U.S. Pat. No. 4,317,058 issued to Blalock on Feb. 23, 1982 for "Electro-Magnetic Reciprocating Engine";

U.S. Pat. No. 4,749,893 issued to Reynolds on Jun. 7, 1988 for "Magnetically Actuated Engine";

U.S. Pat. No. 5,036,930 issued to Bisel et al. on Aug. 6, 1991 for "Electromagnetically Powered Engine Apparatus and Method";

U.S. Pat. No. 5,203,172 issued to Simpson et al. on Apr. 20, 1993 for "Electromagnetically Powered Hydraulic Engine";

U.S. Pat. No. 5,287,518 issued to Miller et al. on Feb. 15, 1994 for "Engine Crankshaft Variable Reluctance Alternator";

U.S. Pat. No. 5,457,349 issued to Gifford on Oct. 10, 1995 for "Reciprocating Electromagnetic Engine".

More specifically, U.S. Pat. No. 4,213,428 discloses a permanent magnet fixedly mounted on a piston with its axis of magnetic polarity disposed parallel to the movement direction of the piston to selectively and magnetically interact with an electromagnetic coil mounted in the engine head coaxially with the motion axis of a piston. The electromagnetic coil is electrically activated in synchronization with the displacement of the piston during the different strokes thereof, to provide magnetic attraction and repulsion during at least a predetermined portion of the compression (and exhaust) and power (and intake) strokes respectively. Although such electromagnetic arrangement augments the efficiency of the motor, it is almost impractical to have an electromagnetic coil located in the engine head due to the lack of available room, especially when considering multi intake and/or exhaust valves for each cylinder. Furthermore, the fact that there always remains a significant gap between the electromagnetic coil and the permanent magnet forming the combustion chamber significantly reduces the capability of efficiently using the electromagnetic forces that gets larger the smaller the gap is. Moreover, this smallest gap between the two occurs only once a complete two-stroke cycle.

Other US Patents refer to the transformation of an internal combustion engine into an electromagnetic engine by replacing the head of the engine as well as the pistons, thereby using only one polarity of any permanent magnet, or by having an electromagnetic arrangement mechanically operatively connected to the crankshaft of the internal combustion engine to recuperate energy or control (synchronize) operation of the system based on the crankshaft position.

None of the above patent uses an electromagnetic system connected to an existing internal combustion engine to significantly increase the efficiency thereof. Similarly, none of the above-mentioned documents teaches an electromagnetic motor efficiently operating on its own, the motor being either a linear displacement type or a rotary type motor.

Accordingly, there is a need for an improved electromagnetic motor.

SUMMARY OF THE INVENTION

It is therefore a general object of the present invention to provide an improved electromagnetic motor.

An advantage of the present invention is that the electromagnetic motor, when used in a hybrid motor, uses a common engine block in connection with a common power transmission gear train and propulsion system, thus being lighter, smaller and less complex to manufacture and maintain than existing hybrid motors.

Another advantage of the present invention is that the electromagnetic motor provides for efficient use of the electromagnetic system.

A further advantage of the present invention is that the electromagnetic motor has an electromagnetic power system that operates in synchronization, preferably electronically, with the position of the permanent magnet relative to the electromagnet, and to the stroke timing of the cooperative internal combustion engine when used in a hybrid motor.

Still another advantage of the present invention is that the electromagnetic motor, when used in a hybrid motor, has an electromagnetic power system that can be operatively adjusted relative to the cooperating internal combustion engine depending on the respective operating conditions and the overall power demand.

Another advantage of the present invention is that the electromagnetic motor has an electromagnetic power system that can be retrofitted into an existing internal combustion engine to be incorporated therewith with minimal modifications thereof, to form a hybrid motor.

Another advantage of the present invention is that the electromagnetic motor, when used in a hybrid motor, has an electromagnetic power system that does not alter the actual functioning of the cooperating internal combustion engine by always acting with and never there against.

A further advantage of the present invention is that the electromagnetic motor optimizes the efficiency of the electromagnetic power system by allowing the interacting magnets to be as close as possible to one another in a quasi-contact configuration, using complementary embossment patterns on the interacting surfaces of the different magnets.

Another advantage of the present invention is that the electromagnetic motor, when used in a hybrid motor, has an electromagnetic power system that can be adapted to most of the existing motors to improve its overall efficiency by reducing the fuel consumption and the emission of pollutant particles/gases.

A further advantage of the present invention is that the electromagnetic motor, especially when used in a hybrid motor, allows energy recuperation outside of normal motor active operation periods such as during vehicle braking and engine compression mode periods.

Yet another advantage of the present invention is that the electromagnetic motor takes advantage of the energy provided by the magnetic repulsion impact boost when two magnets are in a quasi-contact configuration, just before moving away from each other.

Another advantage of the present invention is that the electromagnetic motor, when used in a hybrid motor, has an electromagnetic power system that operates during all strokes of the internal combustion engine, including linear displaced piston engines and/or rotary engines.

Another advantage of the present invention is that the electromagnetic motor, when considering circularly displaced permanent magnets, provides magnetic interactions between the magnets in a direction generally tangential to the circular displacement path of the permanent magnets, for a better motor efficiency.

A further advantage of the present invention is that the electromagnetic motor has an electromagnetic power system that optimally uses both magnetic polarities of the linearly displaced permanent magnet, such as when mounted on the piston or the like.

Yet another advantage of the present invention is that the electromagnetic motor has an electromagnetic power system that optimally and simultaneously uses both magnetic polarities of a same electromagnet.

Still another advantage of the present invention is that the electromagnetic motor has an electromagnetic power system that includes magnets with large interacting surface areas relative to the piston size.

According to an aspect of the present invention, there is provided an electromagnetic motor comprising: a permanent magnet connected to a moving part of the motor linked to an output shaft thereof and defining a moving displacement path of the permanent magnet; and an electromagnet connected to a fixed part of the motor, the electromagnet at least periodically operatively interacting with the permanent magnet, the electromagnet being electrically connectable to a power source for selective activation thereof, the electromagnet magnetically attracting the permanent magnet over a first portion of the displacement path when un-activated and magnetically repulsing the permanent magnet over a second portion of the displacement path when activated by the power source.

In one embodiment, the moving displacement path of the permanent magnet is a circular displacement path, the electromagnet being located adjacent and radially outwardly from the circular displacement path of the permanent magnet to at least periodically operatively interact therewith, with a repulsion direction being substantially tangential to the circular displacement path.

Conveniently, the permanent magnet includes a plurality of permanent magnets substantially circumferentially equally spaced apart from one another, the electromagnet including a plurality of electromagnets substantially circumferentially equally spaced apart from one another, each said permanent magnet periodically operatively interacting with successive of the electromagnets.

Typically, the plurality of electromagnets are momentarily simultaneously activated by the power source.

Conveniently, the permanent magnet includes a first interacting surface for magnetic interaction with a second interacting surface of the electromagnet, the first surface having a first embossment pattern formed thereon, the second surface having a second embossment pattern formed thereon being substantially a complementary pattern of the first embossment pattern.

Typically, the electromagnet includes an attracting permanent magnet connected thereto for magnetically attracting the permanent magnet over the first portion of the circular displacement path. Conveniently, a natural magnetic attraction of the attracting permanent magnet over the permanent magnet is at least cancelled by an electromagnetic repulsion of the electromagnet over the second portion of the circular displacement path when activated by the power source.

In one embodiment, the moving displacement path of the permanent magnet is a linear reciprocating displacement path defining first and second longitudinal limit positions of the permanent magnet, the electromagnet is a first electromagnet positioned adjacent the first limit position, the motor including a second electromagnet connected to the fixed part of the motor adjacent the second limit position and at least periodically operatively interacting with the permanent magnet, the second electromagnet being electrically connectable to the power source for selective activation thereof, the first and second electromagnets being alternately and momentarily activated when the permanent magnet reaches the first and second limit positions, respectively. Conveniently, the permanent magnet has opposite magnetic polarities facing the first and second electromagnets, respectively.

Typically, the permanent magnet has opposite first and second interacting surfaces facing respective third and fourth interacting surfaces of the first and second electromagnets for magnetic interaction therewith, respectively, the first and second surfaces having a first embossment pattern formed thereon, the third and fourth surfaces having a second embossment pattern formed thereon being substantially a complementary pattern of the first embossment pattern. The first and second embossment patterns typically include complementary generally square tooth shape cross-sections.

Conveniently, the motor further includes a third electromagnet connected to the fixed part of the motor located generally halfway between the first and second limit positions adjacent and radially outwardly from the periphery of the permanent magnet to at least periodically operatively interact therewith, the third electromagnet being electrically connectable to the power source for selective activation thereof, the third electromagnet magnetically attracting the permanent magnet over a third portion of the displacement path when un-activated and magnetically repulsing the permanent magnet over a fourth portion of the displacement path when activated by the power source.

Typically, the third electromagnet is electrically and reversibly connectable to the power source for selective reverse alternate magnetic activation thereof.

Typically, the third electromagnet includes an attracting permanent magnet connected thereto for magnetically attracting the permanent magnet over the third portion of the linear reciprocating displacement path. Conveniently, a natural magnetic attraction of the attracting permanent magnet over the permanent magnet is at least cancelled by an electromagnetic repulsion of the third electromagnet over the fourth portion of the linear reciprocating displacement path when activated by the power source.

Conveniently, the motor further includes a recuperation electric coil located generally between the first and second limit positions adjacent and radially outwardly from the periphery of the permanent magnet to at least periodically operatively interact therewith, the electric coil selectively magnetically interacting with the permanent magnet over a third portion of the displacement path to slow down speed of the permanent magnet moving along the displacement path and generate electrical power therefrom useable by an external apparatus connected thereto.

In one embodiment, the motor further includes a controller connecting to the first and second electromagnets to selectively control activation thereof by the power source.

In one embodiment, the permanent magnet is connected to a piston of an internal combustion engine and the first and second electromagnets are connected to an engine block of the internal combustion engine, the motor forming an electromagnetic hybrid motor with the internal combustion engine. Conveniently, the motor further includes a controller connecting to the first and second electromagnets and to an engine computer to selectively control activation of first and second electromagnets by the power source in synchronization with displacement of the piston.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

With reference to the annexed drawings the preferred embodiments of the present invention will be herein described for indicative purpose and by no means as of limitation.

Although the following description refers to an electromagnetic hybrid motor, one skilled in the art would easily understand that the electromagnetic motor could be considered to operate on its own without any other type motor connected thereto, provided that some starter device is mounted thereon to initiate the operation of the electromagnetic motor.

Figure 1:
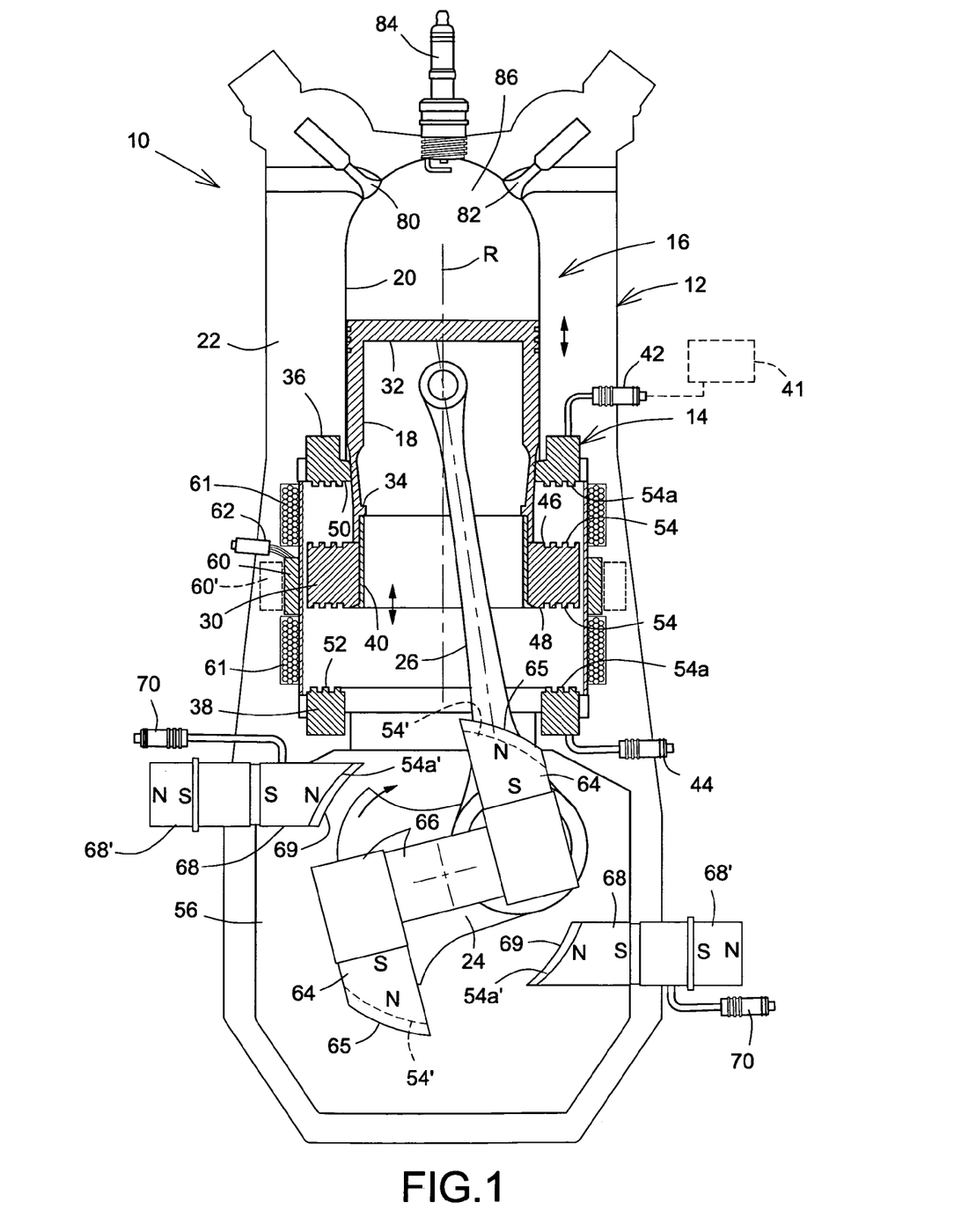
FIG. 1 is a simplified section view of a cylinder of an electromagnetic motor in accordance with an embodiment of the present invention in conjunction with an existing internal combustion engine.

Referring to FIG. 1, there is shown a simplified section of an electromagnetic motor 10 in accordance with an embodiment of the present invention in conjunction with an existing internal combustion engine 12 to provide for an electromagnetic hybrid motor 11. The hybrid motor 11 typically includes a conventional internal combustion engine 12, a gasoline powered engine shown in FIG. 1, with parts preferably made out of non-magnetic materials such as aluminum, titanium and the like alloys or composites, slightly modified to incorporate an electromagnetic power system 14 to increase the overall efficiency of the hybrid motor 11. Although only one cylinder 16 of the hybrid motor 11 is shown, it should be understood that all cylinders of the engine 12 are similarly modified.

The cylinder 16 includes a piston 18 linearly and reciprocally moving inside a bore 20 of an engine block 22 along a reciprocal movement axis R. Conventionally, the piston 18 is movably connected to a crankshaft 24 or output shaft through a connecting rod 26.

As it is well known that the magnetic attraction and repulsion forces between two magnets increase with the decrease of the distance the two magnets, the present invention ensures that all interacting magnets get as close as possible without physically touching each other.

Accordingly, each cylinder 16 of the hybrid motor 11 includes at least one moving permanent magnet 30, such as, but not limited to, neodymium-iron-boron and Alnico types of magnet depending on the operating conditions, mounted on the piston 18 spaced away from the piston head 32, typically adjacent the piston base 34. Fixed first top 36 and second bottom 38 electromagnetic coil magnets are mounted on the engine block 22 for operative interaction with the moving permanent magnet 30. The permanent magnet 30 has a typically annular disc shape and is attached to the piston base 34 via an annular link bracket 40 connecting to the free internal surface of the piston base 34. The top and bottom electromagnets 36, 38, also annular in shape to properly operatively interact with the permanent magnet 30 are so located to be in quasi-contact therewith when the piston 18 is respectively at the more far-away and nearest position relative to the crankshaft 24, along its linear path of motion. It is noted that when the electromagnetic motor 10 is not used in conjunction with an internal combustion engine 12, the permanent magnet 30 and the electromagnets 36, 38 could obviously have disc shapes or any other non-hollowed shapes with the permanent magnet 30 essentially forming the "piston".

The electromagnets 36, 38 are electrically connected to a controller 41 (shown in dotted lines in FIG. 1) and an electrical power source (not shown) via respective connectors 42, 44 for selective activation thereof, as explained in further details hereinbelow.

The top 46 and bottom 48 surfaces of the permanent magnet 30 and the corresponding interacting surfaces 50, 52 of the electromagnets 36, 38 are typically cooperatively profiled with a respective complementary embossment patterns 54, 54a in generally concentric circles. The embossment patterns 54, 54a increase the overall surface area of each surface 46, 48, 50, 52 and the ease of controlling the smallest gap possible at the quasi-contact to increase the magnetic forces between interacting surfaces by optimizing the direction of the magnetic field and by concentrating it (minimizing dispersion thereof) toward the opposite interacting magnet, and increases the piston motion range into which a magnetic impact force between interacting surfaces can be exerted when powering the corresponding electromagnet 36, 38 while still being significant and efficient. The gap is smaller and easier to control (especially considering thermal expansion and the like characteristics of the materials) for surfaces facing substantially radially relative to the axis R of the reciprocal displacement direction of the piston 18. Although the embossment patterns 54, 54a are illustrated as a generally square tooth shape cross-section, any other shape could be considered without deviation from the scope of the present invention, such as, but not limited to, V-shaped tooth type, truncated and/or rounded V-shaped tooth type, tapered square tooth type, saw-tooth type, slightly angled type and the like.

The electromagnetic power system 14 of the hybrid motor 11 typically further includes a powerable electric coil 60 mounted on the engine block 22 that is located substantially halfway between the two electromagnets 36, 38 adjacent and radially outwardly from the periphery of the permanent magnet 30 to operatively interact therewith. The electric coil 60 is electrically connected to the controller 41 and the electrical power source (not shown) via connector 62 for selective activation thereof, as explained in further details hereinbelow. Typically, the electromagnet 60 is at most as wide (along the axis of the cylinder) as the width of the first permanent magnet 30 for more efficient impact repulsions thereof.

As shown in FIG. 1 (and not others for clarity purposes), recuperation electric coil extensions 61 typically located on either side of the electric coil 60, with no electrical connection therewith, toward the two electromagnets 36, 38 to generate electrical power during braking periods of the vehicle and/or compression cycle periods of the internal combustion engine when the transmission downwardly shifts gear to lower speeds. Accordingly, the recuperation electric coil extensions 61 are typically electrically connected to a storage battery, an external electrical apparatus or the like (not shown) via a corresponding coil electrical connector (not shown) and preferably a controller/computer 41. Alternatively, the electric coil 60, similarly to the coil extensions 61, can also be used to generate electrical power during braking periods of the vehicle and/or compression cycle periods of the internal combustion engine when the transmission downwardly shifts gear to lower speeds.

In order to further lower the overall fuel consumption of the hybrid motor 11 or increase its efficiency, the electromagnetic power system 14 may include at least one, typically a plurality (two as shown) and circumferentially equally spaced from one another (diametrically opposed in Figures), second moving permanent magnet 64 typically directly mounted on the crankshaft 24 (or components thereof) via a magnet bracket 66 or the like to operatively and magnetically interact with at least one, typically a plurality (two as shown) and circumferentially equally spaced from one another (diametrically opposed in Figures), third fixed electromagnetic coil magnet 68 mounted on the crankcase 56 of the engine block 22 in a close proximity to the moving circular path of the second magnets 64. Similarly to the first and second electromagnets 36, 38, the third electromagnets 68 that could be submerged in the engine oil (not shown) inside the crankcase 56 are electrically connected to the controller 41 and the electrical power source (not shown) via respective connectors 70 for selective activation thereof. Obviously, the size of the magnets 64, 68, as well as their respective mounting locations (positions on the crankshaft 24 and positions of the crankcase 56) could vary from the ones shown in the Figures without departing from the scope of the present invention.

When a plurality of permanent magnets 64 and electromagnets 68 are used, the quantity of one type of magnet needs to be a factor of the quantity of the other type. Also, when there is a plurality of electromagnets 68, all of them are typically simultaneously activated, unless for example there are twice the quantity of electromagnets 68 relative to the permanent magnets 64 in which case the two halves of the electromagnets simultaneously interacting with corresponding permanent magnets are alternately simultaneously momentarily activated.

Typically, the interacting surfaces 65, 69 of the corresponding magnets 64, 68 are of an arc section in order to get and move as close as possible to one another for efficient periodic electromagnetic interaction there between. Similarly to the other magnets 30, 36, 38, the arcuate surfaces 65, 67 have a respective complementary circumferential embossment patterns 54', 54a' such as circumferentially oriented tongues and grooves or the like.

Although they could be located at any position around the crankshaft 24, the third electromagnets 68 are typically at positions that would enable them to provide for the larger repulsion force to the magnets 64, and generally tangential to the rotational displacement path of the crankshaft-connecting rod rotation connection axis, when the piston 18 is at its longitudinal extreme or limit positions relative to the crankshaft, preferably at the more far-away position and optionally at the nearest position, when the axis connecting rod 26 generally intersects the axis of the crankshaft 24.

Obviously, the magnets 64, 68 of the crankshaft region would be the only ones present in the case of a rotary engine such as a Wankel engine or the like because of the absence of any linearly and reciprocally moving engine components.

Although not illustrated in the Figures for clarity purposes, there could be some air circulation holes (not shown) extending generally axially through magnet 30 and/or openings (not shown) at the periphery thereof, on the piston side wall or any other suitable location in order to allow air to freely flow to and from the volume area located between the magnet 30 and the first electromagnet 36 without exerting some reaction pressure load on the piston assembly that would impede on the proper functioning of the hybrid motor 11.

Operation

Figure 4A:
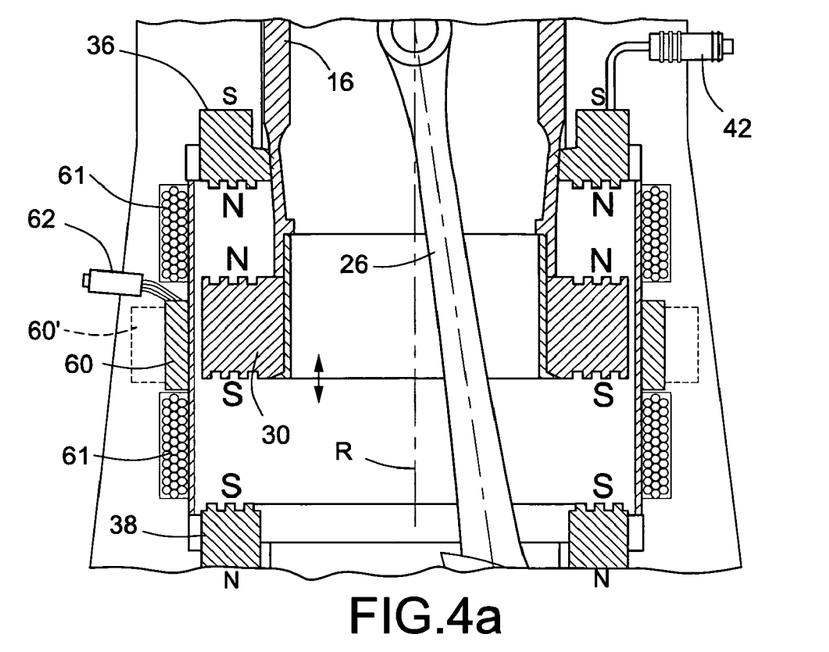
FIG. 4a is a simplified enlarged section view of the embodiment of FIG. 1, showing a typical arrangement of the magnetic fields of the two fixed electromagnetic coils for interaction with the moving permanent magnet.

As shown in FIGS. 1 and 4a, each magnet surface 46, 48, 50, 52, 65, 69 typically has a same magnetic polarity N, S (North, South or Positive, Negative) over its entire surface, and each magnet 30, 36, 38 has an axis of magnetic polarity substantially parallel to the piston reciprocation axis R while each magnet 64, 68 has an axis of magnetic polarity substantially tangential to the crankshaft 24 about its axis. The surfaces 50, 52 of the two electromagnets 36, 38 exhibit their polarity only when electrically powered with a same polarity as the corresponding interacting surface 46, 48 such that each respective electromagnet 36, 38 alternately repulses the permanent magnet 30, starting the moment the magnet 30 is at the nearest relative to the corresponding electromagnet 36, 38 or just thereafter, to further provide a non significant magnetic impact induced motion thereon. Similarly, surfaces 69 of the electromagnets 68 exhibit their polarity only when electrically powered with a same polarity as the corresponding interacting surface 65 such that each respective electromagnet 68 periodically repulses the corresponding permanent magnet 64, starting at the moment the magnet 64 is at the nearest (in tangential line) relative to the corresponding electromagnet 68 or just thereafter, to further provide a non significant magnetic impact induced motion thereon; the direction of the repulsion being tangential to the circular displacement path, or perpendicular to the radial direction of the axis of rotation of the crankshaft 26.

By properly positioning of the electromagnets 68 interacting with the circularly moving permanent magnets 64 around the circular path, it becomes possible to provide some repulsion pulses that are always fully efficient (because of the tangential direction of the repulsion force), as opposed to the electromagnets 36, 38 that provide for a repulsion pulse when the connecting rod 26 is generally in line with the cylinder axis R, when it is less efficient. In order to be more efficient, the repulsion pulse needs to be provided when the angle between the rod 26 and the axis R is about at its maximal value, as realized, to the possible extent limited with the physical configuration of the electromagnetic system 14, with the third electromagnet 60.

Figure 3:
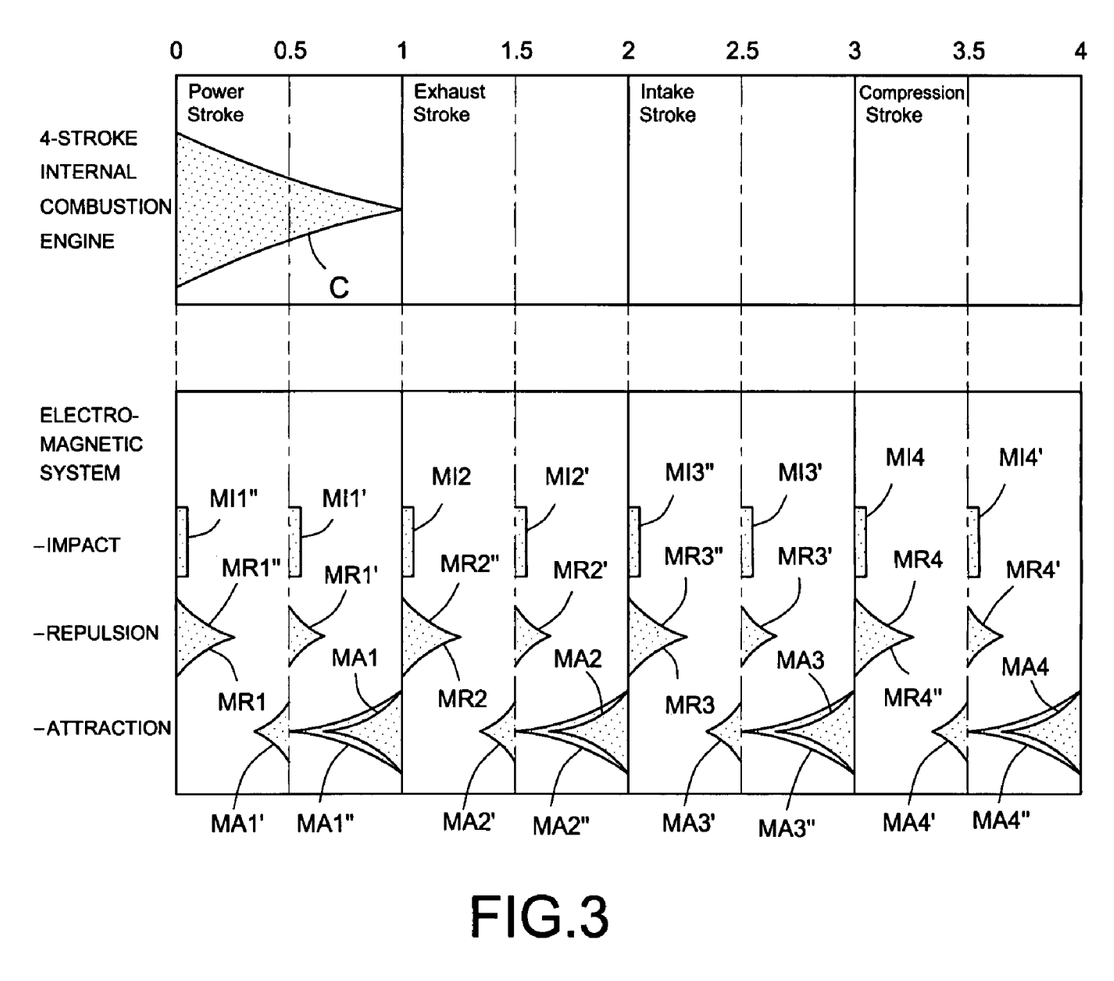
FIG. 3 is a schematic diagram showing a typical combustion and electromagnetic power generation of the embodiment of FIG. 1 over a complete four-stroke cycle.

As way of example only, the following typical operation description illustrated in FIG. 3 refers to a four-stroke gasoline internal combustion engine 12 but the same principles apply for a two-stroke engine and/or diesel type engine, and/or rotary engine (not shown) in which only magnets 64, 68 are present.

Figure 2A:
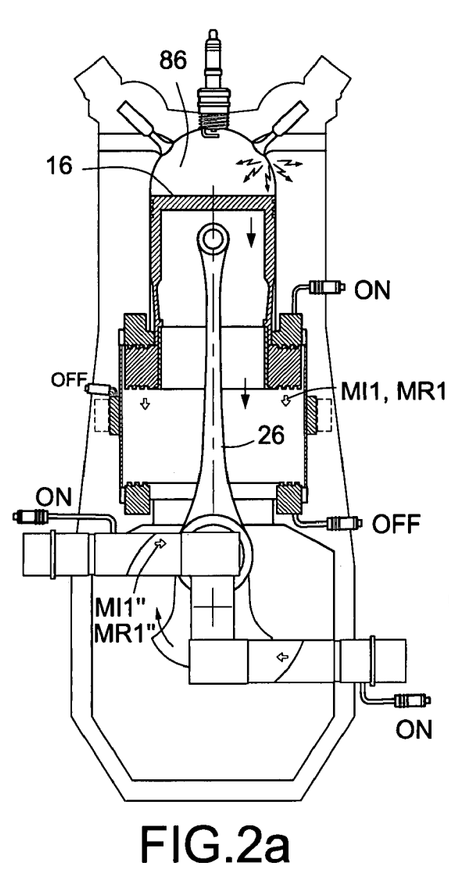
FIGS. 2a through 2f are simplified views similar to FIG. 1, showing different positions of the permanent magnet attached to the piston over almost a complete two-stroke half cycle.
Figure 2B:
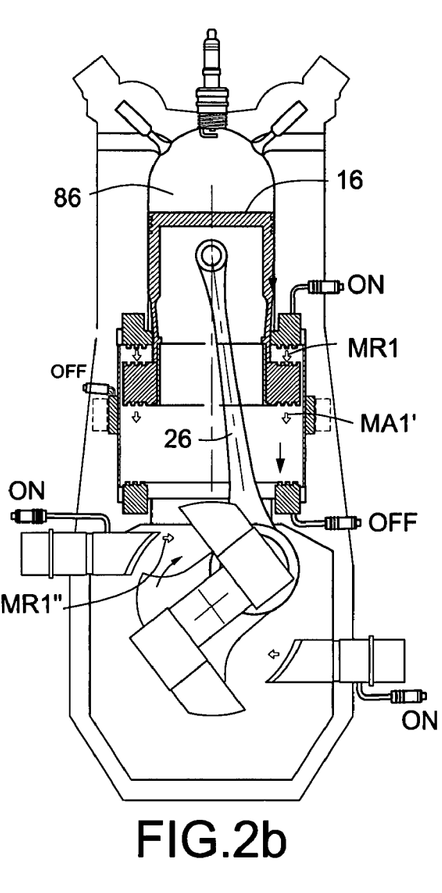
Figure 2C:
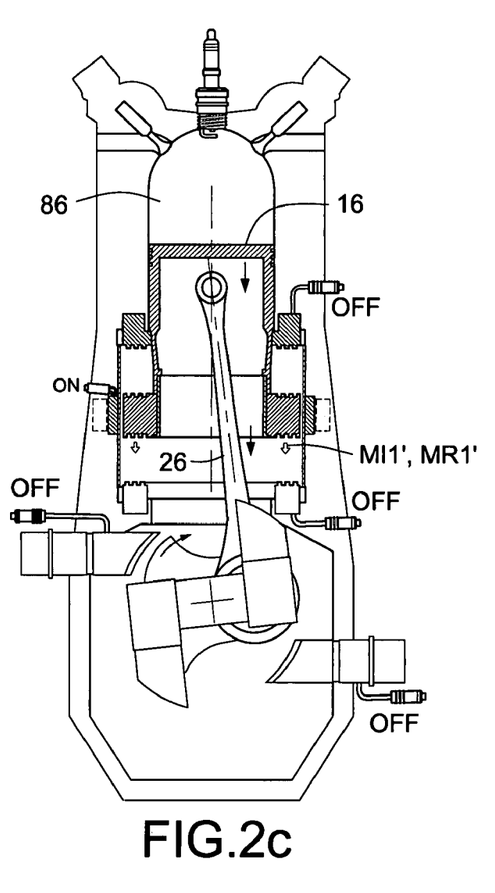

In operation, as partially illustrated in FIGS. 2a through 2f, the permanent magnet 30 linearly reciprocally travels between the two electromagnets 36, 38 during each stroke of the piston 16 while the permanent magnets 64 continuously rotate between the electromagnets 68. In FIG. 2a, the piston 16 is in the upper position at the beginning of the power stroke, time "0" of FIG. 3, at which the two intake 80 and exhaust 82 valves are closed and the sparkplug 84 (or the required fuel-air mixture compression of diesel engines) ignites the combustion of the air-gasoline mixture located inside the combustion chamber 86. The power of the combustion explosion, illustrated by the upper transversal peak C of FIG. 3, pushes the piston 16 down and at about the same time, the first and third electromagnets 36, 68 are electrically activated, or turned ON, to provide a generally instantaneous magnetic repulsive impacts and the magnetic repulsions, illustrated by the square peaks MI1, MI1" and the lower transversal peaks MR1, MR1" of FIG. 3 respectively, with the magnets 30, 64 mounted on the piston 16 and the crankshaft 24. The magnetic repulsions MR1, MR1" typically continue until slightly before the permanent magnet 30 reaches about the mid-position between the two electromagnets 36, 38 when its efficiency really starts becoming useless relative to the required activation energy of the first and third electromagnets 36, 68, as shown in FIG. 2b. At about this time, the permanent magnet 30 gets close to its travel mid-position to start getting naturally magnetically attracted by the non-activated electromagnet 60 because of the paramagnetic material therein, also called a secondary magnetic attraction effect illustrated by the relatively small lower reverse transversal peak MA1' before time "0.5" of FIG. 3. Then the magnet 30 reaches the travel mid-position region during which both electromagnets 36, 38 are non-activated or turned OFF, as shown in FIG. 2c, while electromagnet 60 gets activated or turned ON, to provide a generally instantaneous magnetic repulsive impacts and the magnetic repulsions, illustrated by the square peak MI1' and the lower transversal peak MR1' of FIG. 3 respectively.

Figures 2D, 2E:
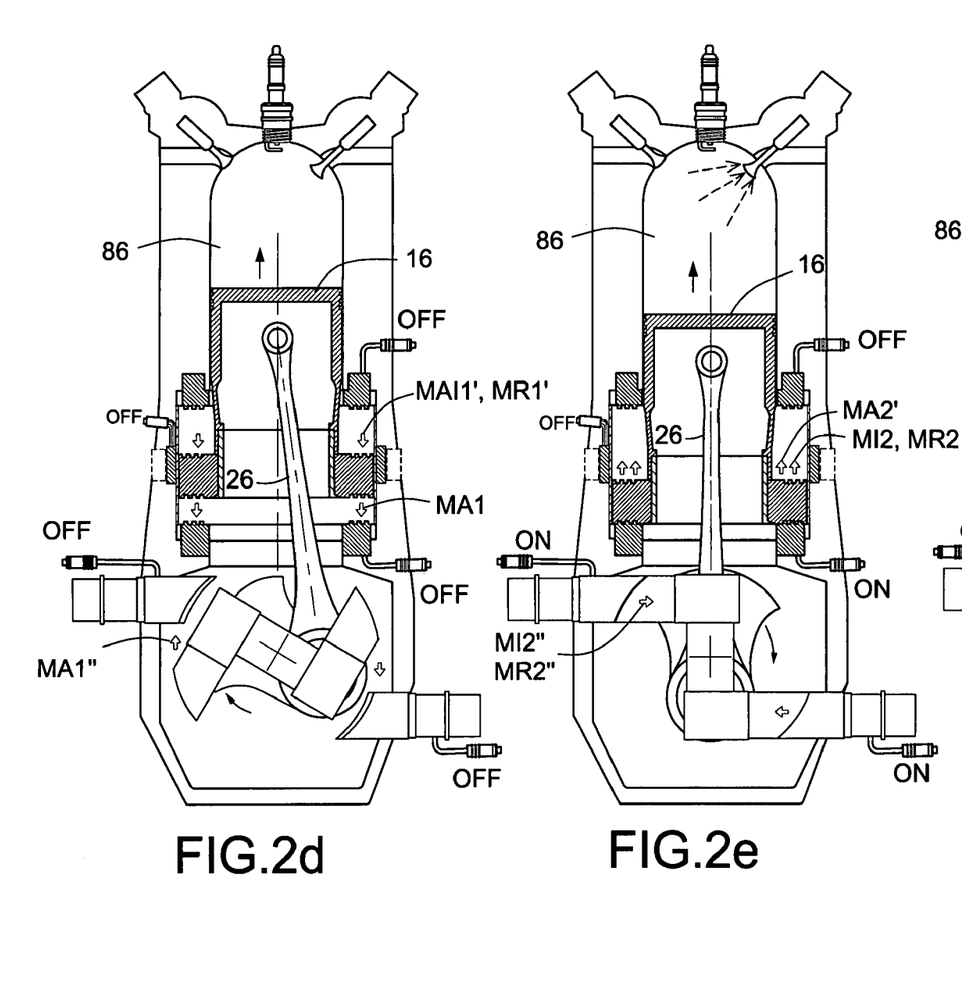

As shown in FIG. 2d, when the permanent magnets 30, 64 get respectively closer to the non-activated second and third electromagnets 38, 68 they are naturally magnetically attracted thereby because of the paramagnetic material therein, also called a secondary magnetic attraction effect illustrated by the relatively small respective lower reverse transversal peaks MA1, MA1" before time "1" of FIG. 3.

At the transition between the power stroke and the following exhaust stroke, at time "1" of FIG. 3, the second and third electromagnets 38, 68 are being turned ON to provide a second generally instantaneous magnetic repulsive impact and a second magnetic repulsion, illustrated by the square peaks MI2, MI2" and the lower transversal peaks MR2, MR2" of FIG. 3 respectively, to repel away the permanent magnets 30, 64 mounted on the piston 16 toward the first electromagnet 36 and on the crankshaft 24, as shown in FIG. 2e with the burned air-gasoline mixture exiting the combustion chamber 86 through the open exhaust valve 82.

Just before reaching time "1.5" of FIG. 3, the permanent magnet 30 gets back close to its travel mid-position to start getting naturally magnetically attracted by the non-activated electromagnet 60 as illustrated by the relatively small lower reverse transversal peak MA2'. Then the magnet 30 reaches the travel mid-position region during which both electromagnets 36, 38 are non-activated or turned OFF, while electromagnet 60 gets activated or turned ON with a reversed polarity as of time "0.5", to provide a generally instantaneous magnetic repulsive impacts and the magnetic repulsions, illustrated by the square peak MI2' and the lower transversal peak MR2' of FIG. 3 respectively.

Figure 2F:
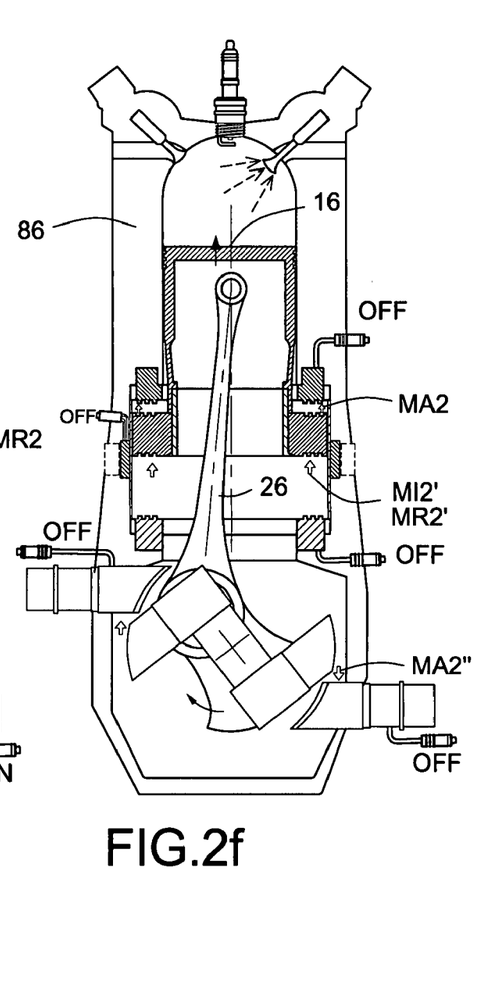

Slightly before completing the first two-stroke half cycle at time "2" of FIG. 3, as shown in FIG. 2f, when the permanent magnets 30, 64 get back closer to the respective first and third electromagnets 36, 68 they are naturally magnetically attracted thereby because of the paramagnetic material therein, also called a secondary magnetic attraction effect illustrated by the relatively small lower reverse transversal peaks MA2, MA2" before time "2" of FIG. 3.

For the last two intake and compression strokes occurring between time "2" and time "4" through times "2.5" "3" and "3.5" of FIG. 3, the operation of the electromagnetic power system 14 is similar to the one explained hereinabove for the first two strokes in which the repulsive electromagnetic MI1, MI1", MR1, MR1", MI1', MR1', MI2, MI2", MR2, MR2", MI2', MR2' and attractive magnetic MA1', MA1, MA1", MA2', MA2, MA2" forces between the permanent magnets 30, 64 and the corresponding electromagnets 36, 38, 60, 68 are respectively replaced by the repulsive electromagnetic MI3, MI3", MR3, MR3", MI3', MR3', MI4, MI4", MR4, MR4", MI4', MR4' and attractive magnetic MA3', MA3, MA3", MA4', MA4, MA4" forces illustrated of FIG. 3. All the above electromagnetic forces are, induces by periodically, electrically pulsing the different electromagnets 36, 38, 60, 68 over about few milliseconds (or even fractions thereof) durations to cause energy consumption, while the permanent magnets 30, 64 provide for the all the amount of available magnetic energy, because of their relative positions to the respective periodically activated electromagnets. These attractive and repulsive magnetic forces typically occur over a first and a second portion of the corresponding moving displacement path of the permanent magnet 30, 64, as schematically illustrated in FIG. 3. Each first and second portion could obviously include a plurality of successive sub-portions over a same displacement cycle depending on the quantity of magnets located along the respective displacement path.

As mentioned hereinabove, the timing of all the electromagnetic forces is typically in synchronization with the four-stroke cycle of the internal combustion engine 12, when applicable, via an electronic controller 41 or the like.

Furthermore, during periods when no power is required from the hybrid motor 11, such as braking periods and engine compression braking mode periods, the electromagnets can remain non-activated not to consume energy that would further be counterproductive by working against the braking of the motor 11 and the reciprocating displacement of the permanent magnet 30 and its magnetic field in the proximity of the electric coil extensions 61 can generate electrical power that can be directly use or even stored for future use.

Alternatives

In order to improve the magnetic attraction of the different electromagnets 60, 68 when non-activated, they typically include a respective attracting permanent magnet 60' (shown in dotted lines in the Figures because of its full efficiency in only half of the linear displacement of the permanent magnet 30), 68' connected thereto, typically at the backside thereof. With these attracting magnets 60', 68', the respective electromagnets 60, 68 essentially become extensions thereof. On the other hand, when they are activated or turned ON, the electromagnets 60, 68 are typically strong enough to at least cancel and overcome the magnetic field of their respective attracting magnet 60', 68' with a magnitude similar to the corresponding permanent magnet 30, 64, as if the attracting magnets 60', 68' would not be there and attract the corresponding permanent magnets 30, 64 as they should repulse them. Although not shown, similar attracting permanent magnets could be connected to electromagnets 36, 38, respectively.

Figure 4B:
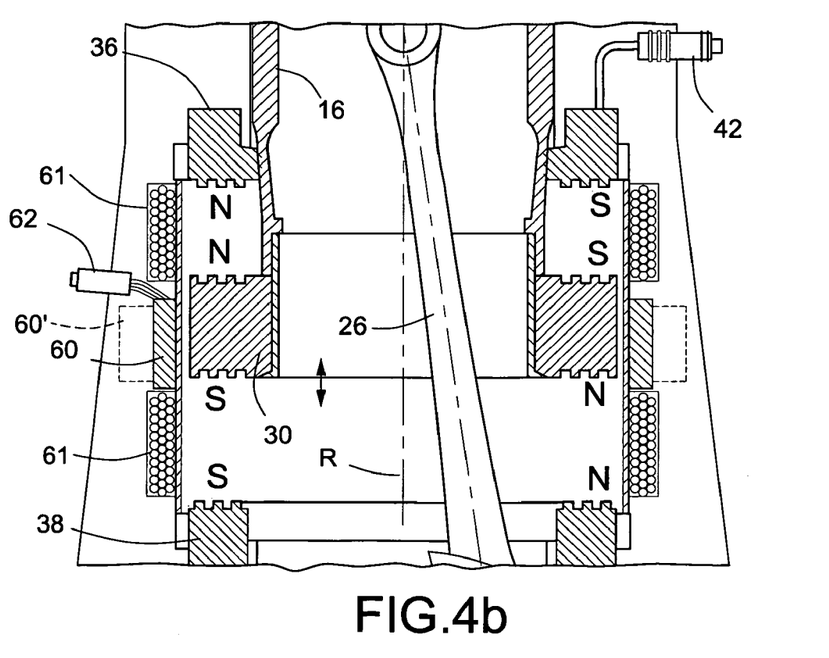
FIG. 4b is a view similar to FIG. 4a, showing a different arrangement of the different magnetic fields.

FIG. 4b shows an alternative way of orienting the magnetic polarities of the permanent magnet 30 and the electromagnets 36, 38, 60. All magnets 30, 36, 38, 60 could have their circumference subdivided into a plurality of an even number of segments of generally equal dimensions having alternating magnetic polarities N, S, such as two half annulus in the example illustrated. This embodiment would allow the electromagnets 36, 38 to have their physical design (U-shaped magnetic field axis) made in such a way that both their magnetic polarities are used to operatively magnetically interact with a corresponding portion of the permanent magnet 30 which can be manufactured with relatively high directionality of the magnetic fields to ensure that there would not be any electromagnetic attraction between non-respective magnets/electromagnets when electromagnetic repulsion is forced between respective magnets/electromagnets.

As it would be obvious to one skilled in the art, magnets 30, 64 and electromagnets 36, 38, 60, 68 could be disposed at different locations without departing from the scope of the present invention. Similarly, additional magnet(s) and/or electromagnet(s) could be added at other locations such as the crankshaft 24 and crankcase 56, transmission shaft and the like without departing from the scope of the present invention.

Furthermore, one skilled in the art would easily understand that the electromagnetic power system of the present invention could be used in conjunction with any other type of engine such as, but not limited to, linearly moving connecting rod engines, including the Wiseman engine and the Bourke engine which enable multiple permanent magnets to move between corresponding electromagnets because of the capability of having longer connecting rods, and rotary engines.

Although not preferred because of its need of relatively high electrical power consumption for a relatively low power output gain, the electromagnets 36, 38, 60, 68 could eventually be selectively activated for a reverse polarity configuration to attract the corresponding permanent magnet 30, 64 approaching thereto, whenever desired, for additional motor output power as an example.

Although not specifically illustrated herein, the electromagnets 36, 38, 68 could be used in conjunction with corresponding fixed permanent magnets attached thereto to interact with the mobile (moving) permanent magnet 30, 64; the fixed permanent magnets repulsing the corresponding mobile permanent magnet 30, 64. The electromagnets 36, 38, 68 would therefore be used to momentarily at least cancel (or overcome) the repulsion of their respective fixed permanent magnet and further attract the corresponding mobile permanent magnet 30, 64, upon approach thereof along their displacement path, when activated by the controller 41 and the power source.

Although the present electromagnetic motor 10 has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. An electromagnetic motor, comprising:
a permanent magnet connected to a moving part of the motor linked to an output shaft thereof and defining a moving displacement path of the permanent magnet; and
an electromagnet connected to a fixed part of the motor, the electromagnet at least periodically operatively interacting with the permanent magnet, the electromagnet being electrically connectable to a power source for selective activation thereof, the electromagnet magnetically attracting the permanent magnet over a first portion of the displacement path when un-activated and magnetically repulsing the permanent magnet over a second portion of the displacement path when activated by the power source, wherein the moving displacement path of the permanent magnet is a circular displacement path, the electromagnet being located adjacent and radially outwardly from the circular displacement path of the permanent magnet to at least periodically operatively interact therewith, with a repulsion direction being substantially tangential to the circular displacement path.

2. The motor of claim 1, wherein the permanent magnet includes a plurality of permanent magnets substantially circumferentially equally spaced apart from one another, the electromagnet including a plurality of electromagnets substantially circumferentially equally spaced apart from one another, each said permanent magnet periodically operatively interacting with successive of the electromagnets.

3. The motor of claim 2, wherein the plurality of electromagnets are momentarily simultaneously activated by the power source.

4. The motor of claim 1, wherein the permanent magnet includes a first interacting surface for magnetic interaction with a second interacting surface of the electromagnet, the first surface having a first embossment pattern formed thereon, the second surface having a second embossment pattern formed thereon being substantially a complementary pattern of the first embossment pattern.

5. The motor of claim 4, wherein the first and second embossment patterns include complementary circumferential tongues and grooves.

6. The motor of claim 1, wherein the electromagnet includes art attracting permanent magnet connected thereto for magnetically attracting the permanent magnet over the first portion of the circular displacement path.

7. The motor of claim 6, wherein a natural magnetic attraction of the attracting permanent magnet over the permanent magnet is at least cancelled by an electromagnetic repulsion of the electromagnet over the second portion of the circular displacement path when activated by the power source.

8. An electromagnetic motor, comprising:
a permanent magnet connected to a moving part of the motor linked to an output shaft thereof and defining a moving displacement path of the permanent magnet; and
an electromagnet connected to a fixed part of the motor, the electromagnet at least periodically operatively interacting with the permanent magnet, the electromagnet being electrically connectable to a power source for selective activation thereof, the electromagnet magnetically attracting the permanent magnet over a first portion of the displacement path when un-activated and magnetically repulsing the permanent magnet over a second portion of the displacement path when activated by the power source, wherein the moving displacement path of the permanent magnet is a linear reciprocating displacement path defining first and second longitudinal limit positions of the permanent magnet, the electromagnet is a first electromagnet positioned adjacent the first limit position, the motor including a second electromagnet connected to the fixed part of the motor adjacent the second limit position and at least periodically operatively interacting with the permanent magnet, the second electromagnet being electrically connectable to the power source for selective activation thereof, the first and second electromagnets being alternately and momentarily activated when the permanent magnet reaches the first and second limit positions, respectively.

9. The motor of claim 8, wherein the permanent magnet has opposite magnetic polarities facing the first and second electromagnets, respectively.

10. The motor of claim 8, wherein the permanent magnet has opposite first and second interacting surfaces facing respective third and fourth interacting surfaces of the first and second electromagnets for magnetic interaction therewith, respectively, the first and second surfaces having a first embossment pattern formed thereon, the third and fourth surfaces having a second embossment pattern formed thereon being substantially a complementary pattern of the first embossment pattern.

11. The motor of claim 10, wherein the first and second embossment patterns include complementary generally square tooth shape cross-sections.

12. The motor of claim 8, further including a third electromagnet connected to the fixed part of the motor located generally halfway between the first and second limit positions adjacent and radially outwardly from the periphery of the permanent magnet to at least periodically operatively interact therewith, the third electromagnet being electrically connectable to the power source for selective activation thereof, the third electromagnet magnetically attracting the permanent magnet over a third portion of the displacement path when un-activated and magnetically repulsing the permanent magnet over a fourth portion of the displacement path when activated by the power source.

13. The motor of claim 12, wherein the third electromagnet is electrically and reversibly connectable to the power source for selective reverse magnetic activation thereof.

14. The motor of claim 13, wherein the third electromagnet is electrically connectable to the power source for selective alternate activation and reverse magnetic activation thereof.

15. The motor of claim 8, wherein the permanent magnet is a first permanent magnet, the motor including at least one second permanent magnet connected to the moving part of the motor and defining a second moving circular displacement path thereof, at least one third electromagnet connected to the fixed part of the motor located adjacent and radially outwardly from the circular displacement path of the at least one second permanent magnet to at least periodically operatively interact therewith, the third electromagnet being electrically connectable to the power source for selective activation thereof, the at least one third electromagnet magnetically attracting the at least one second permanent magnet over a first portion of the circular displacement path when un-activated and magnetically repulsing the at least one second permanent magnet over a second portion of the circular displacement path when activated by the power source.

16. The motor of claim 15, wherein the at least one second permanent magnet includes a plurality of second permanent magnets substantially circumferentially equally spaced apart from one another and the at lest one third electromagnet includes a plurality of third electromagnets substantially circumferentially equally spaced apart from one another, each second permanent magnet periodically operatively interacting with successive of the third electromagnets.

17. The motor of claim 15, wherein the at least one second permanent magnet includes a first interacting surface for magnetic interaction with a second interacting surface of the at lest one third electromagnet, the first surface having a first embossment pattern formed thereon, the second surface having a second embossment pattern formed thereon being substantially a complementary pattern of the first embossment pattern.

18. The motor of claim 17, wherein the first and second embossment patterns include complementary and circumferentially oriented tongues and grooves.

19. The motor of claim 12, wherein the third electromagnet includes an attracting permanent magnet connected thereto for magnetically attracting the permanent magnet over the third portion of the linear reciprocating displacement path.

20. The motor of claim 19, wherein a natural magnetic attraction of the attracting permanent magnet over the permanent magnet is at least cancelled by an electromagnetic repulsion of the third electromagnet over the fourth portion of the linear reciprocating displacement path when activated by the power source.

21. The motor of claim 8, further including a recuperation electric coil located generally between the first and second limit positions adjacent and radially outwardly from the periphery of the permanent magnet to at least periodically operatively interact therewith, the electric coil selectively magnetically interacting with the permanent magnet over a third portion of the displacement path to slow down speed of the permanent magnet moving along the displacement path and generate electrical power therefrom useable by an external apparatus connected thereto.

22. The motor of claim 8, further including a controller connecting to the first and second electromagnets to selectively control activation thereof by the power source.

23. The motor of claim 8, wherein the permanent magnet is connected to a piston of an internal combustion engine and the first and second electromagnets are connected to an engine block of the internal combustion engine, the motor forming an electromagnetic hybrid motor with the internal combustion engine.

24. The motor of claim 23, further including a controller connecting to the first and second electromagnets and to an engine computer to selectively control activation of first and second electromagnets by the power source in synchronization with displacement of the piston.

* * * * *